United States Patent Office 3,271,251
Patented Sept. 6, 1966

3,271,251
GERM-COUNTERACTING COMPOSITIONS
John A. Vaichulis, 7204 S. Campbell Ave.,
Chicago 29, Ill.
No Drawing. Filed June 24, 1963, Ser. No. 290,172
9 Claims. (Cl. 167—65)

This application is a continuation-in-part of application Serial No. 797,046, filed March 4, 1959, now abandoned.

My invention relates to germ-counteracting compositions which have been found to have particular utility for inhibiting growth of tubercle bacilli and to possess bactericidal properties, as distinguished from bacteriostatic properties, with respect to said bacilli.

In Patent No. 2,668,135, dated February 2, 1954, in which I am a joint patentee, new and useful compositions are disclosed having germ-counteracting properties, said compositions being effective in the treatment of various infections attributable to pneumococci, staphylococci and streptococci. Such compositions comprise mixtures of a penicillin with a bacterial sulfonamide, sodium benzoate, ethyl alcohol, a non-toxic acid, and water to provide a solution having a pH within the range of about 6.5 and about 7. They are ineffective against tubercle bacilli.

Various attempts have heretofore been made to destroy the viability of tubercle bacilli, including the utilization of various sulfonamides, antibiotics and isoniazid. Thus, for instance, streptomycin, even in concentrations of 1000γ per cc. in contact in vitro for three months, does not destroy the viability of tubercle bacilli. (The American Review of Tuberculosis, vol. 63, No. 1, January 1961.) It is likewise known that, even when tubercle bacilli are exposed for as long as five weeks to amounts of isoniazid (isonicotinic acid hydrazide) 100,000 times greater than the minimal growth inhibitory concentration, revival of said tubercle bacilli can be accomplished. Combinations of isoniazid with antibiotics have also heretofore been suggested for tuberculosis therapy but they are not effective to achieve the results of the compositions of my present invention. Thus, for instance, compositions comprising buffered penicillin, streptomycin sulfate, dihydrostreptomycin sulfate, sodium p-aminosalicylate and isoniazid have been proposed for use in tuberculosis therapy but their effectiveness against tubercle bacilli is inadequate, over and above the fact that such compositions are hazardous if sought to be administered intravenously to patients.

I have made the discovery, and my present invention is based thereon, that the inclusion of a hydrazine derivative of isonicotinic acid, such as (a) isoniazid (INH), (b) 1-isonicotinyl-2-isopropylhydrazine, (c) 1-isonicotinyl-2-glycosylhydrazine, and (d) 1-isonicotinyl-2-isobutylhydrazine, especially isoniazid, containing at least certain of the ingredients of the aforesaid patent, as hereafter specifically pointed out, results in novel compositions which have wholly unexpected properties in inhibiting growth of tubercle bacilli. This was unpredictable because, as stated above, the compositions of the aforesaid patent are ineffective against tubercle bacilli; and isoniazid or other hydrazine derivatives of isonicotinic acid, while useful in tuberculosis therapy, have not proven adequately effective to inhibit growth of tubercle bacilli as indicated, for example, above. In accordance with my invention, the novel combinations of ingredients which I have discovered exert a potentiating or synergistic effect on each other so that extremely low dosages or low levels of concentrations of the active materials are highly effective in inhibiting the growth of tubercle bacilli, a fact which has been demonstrated in vitro experiments.

It is well known in the art that tubercle bacilli tend to become resistant to isoniazid, such resistant tubercle bacilli will grow in the presence of isoniazid or other hydrazine derivatives of isonicotinic acid, and such resistant tubercle bacilli not uncommonly develop in patients being treated with isoniazid or similar derivatives. In such instances, heretofore known isoniazid or similar therapy is of no value. I have found, among other things, that tubercle bacilli which are resistant to inhibition by isoniazid or like compounds in concentrations of more than 10 mcgms./ml. can be controlled through the utilization of compositions made in accordance with my present invention. Furthermore, with certain virulent strains of tubercle bacilli, such as $H_{37}Rv$, which do not respond to and cannot be controlled by isoniazid or like therapy, I have found that such virulent strains can be effectively controlled with the compositions of my invention.

The compositions of my present invention consist essentially of or contain, as essential ingredients, isonicotinic acid hydrazide (isoniazid) or other hydrazine derivatives of isonicotinic acid, penicillin (and its salts such as sodium penicillin and potassium penicillin), sodium benzoate, water, and a non-toxic acidic material to produce an aqueous solution having a pH between 6 and 7. In the particularly preferred compositions of my invention, one or more bacterial sulfonamides are also included and the same is true of ethyl alcohol. In those instances where the antibacterial sulfonamides are contra-indicated because of allergenicity in any particular individual, said sulfonamides will, of course, be omitted. Other ingredients are optional although they may serve useful purposes under various circumstances. Illustrative of such ingredients are heparin (an anticoagulant), dextrose, sodium chloride, water-soluble vitamins, minerals and amino acids.

In preparing the compositions of my invention, it is most convenient initially to form a solution of all of the ingredients, except the penicillin, and then add the penicillin. However, any other order of mixing the ingredients may be utilized.

The following examples are illustrative of germ-counteracting agents made in accordance with my present invention. It will be understood that other compositions can be made wherein the proportions of ingredients are varied, and other modifications may also be made in the light of the guiding principles and teachings disclosed herein.

*Example 1*

Penicillin, 20,000,000 units.
Sodium benzoate, 20 grams.
Sulfamerazine, 2 grams.
Sulfadiazine, 2 grams.
Sulfamethazine, 2 grams.
Isoniazid, 200 milligrams.
Heparin, 25,000 units.
Water, 2 liters.
Non-toxic acid to bring pH to 6.8.

*Example 2*

Penicillin, 30,000,000 units.
Sodium benzoate, 20 grams.
Isoniazid, 300 milligrams.
Water, 2 liters.
Non-toxic acid to bring pH to 6.8.

Example 3

Isoniazid, 250 milligrams.
Penicillin, 20,000,000 units.
Sodium benzoate, 20 grams.
Sulfamerazine, 2 grams.
Sulfadiazine, 2 grams.
Sulfathiazole, 2 grams.
Ethyl alcohol, 100 cubic centimeters.
Water, 2 liters.
Hydrochloric acid to produce pH of 6.9.

Example 4

Isoniazid, 200 milligrams.
Penicillin (sodium salt), 20,000,000 units.
Sodium benzoate, 21 grams.
Sulfamerazine, 1.5 grams.
Sulfadiazine, 2.0 grams.
Sulfamethazine, 2.0 grams.
Ethyl alcohol, 100 cubic centimeters.
5% dextrose–0.9% sodium chloride solution, 2 liters.
Hydrochloric acid to produce pH of 6.8.

Example 5

Isoniazid, 300 milligrams.
Penicillin, 30,000,000 units.
Sodium benzoate, 24 grams.
Sulfadiazine, 3 grams.
Sulfathiazole, 3 grams.
Water, 2 liters.
Hydrochloric acid to produce pH of 6.7.

Example 6

Isoniazid, 200 milligrams.
Penicillin, 15,000,000 units.
Sodium benzoate, 18 grams.
Sulfadiazine, 2 grams.
Sulfathiazole, 2 grams.
Water, 2 liters.
Hydrochloric acid to produce pH of 6.9.

Example 7

Isoniazid, 175 milligrams.
Penicillin, 15,000,000 units.
Sodium benzoate, 18 grams.
Sulfanilamide, 5 grams.
Ethyl alcohol, 100 cubic centimeters.
5% dextrose solution, 2 liters.
Hydrochloric acid to produce pH of 6.8.

Example 8

Isoniazid, 250 milligrams.
Penicillin, 28,000,000 units.
Sodium benzoate, 20 grams.
Sulfadiazine, 2.2 grams.
Sulfamerazine, 1.0 gram.
Sulfathiazole, 2.2 grams.
Water, 2 liters.
Hydrochloric acid to produce pH of 6.8.

Example 9

Isoniazid, 250 milligrams.
Penicillin (sodium), 20,000,000 units.
Sodium benzoate, 20 grams.
Water, 2 liters.
Hydrochloric acid to bring pH to 6.

Example 10

1-isonicotinyl-2-isopropylhydrazine, 200 milligrams.
Penicillin (sodium), 18,000,000 units.
Sodium benzoate, 18 grams.
Sulfamerazine, 2 grams.
Sulfadiazine, 2 grams.
Sulfamethazine, 2 grams.
Ethyl alcohol, 100 cubic centimeters.
Water, 2 liters.
Hydrochloric acid to bring pH to 6.

While any of the sulfonamides which are effective against bacteria (hereafter, for convenience, called antibacterial sulfonamides) may be employed as, for example, sulfanilamide, sulfathiazole, sulfadiazine, sulfamerazine, sulfamethazine, it is especially advantageous to utilize two or more thereof in the compositions of the present invention, as is illustrated more particularly in the foregoing examples.

It is particularly advantageous to use hydrochloric acid as the non-toxic acid ingredient but other non-toxic acidic materials may be employed as, for example, acetic acid, citric acid, tartaric acid, malic acid and the like.

While the proportions of the several ingredients are somewhat variable, good results are obtained, in general, when the compositions contain said ingredients in the following ranges of proportions in relation to each other:

Isoniazid or other isonicotinic acid
  hydrazine derivative _____ 100–400 milligrams.
Penicillin _____ 15,000,000–30,000,000 units.
Sodium benzoate _____ 18–26 grams.
Antibacterial sulfonamide (where
  utilized) _____ Up to about 8, preferably 4–8 grams.
Ethyl alcohol (where utilized) ___ Up to about 120, preferably 80–120 cc.
Non-toxic acid, to adjust to _____ pH 6–7.
Water _____ 1.8–2.2 liters.

Other supplemental ingredients, where utilized, can likewise be employed in variable proportions as, for instance, dextrose (75 to 125 grams), sodium chloride (10 to 20 grams), amino acids, vitamins, minerals, anticoagulating agents and the like to suit dosage requirements.

As illustrative of in vitro tests made with a typical composition of my present invention as against other compositions, the following table is presented. A pH of 6 was selected for said tests because penicillin is most stable at said pH, said pH is generally ideal for the growth of tubercle bacilli and because it is essentially the pH of caseous tuberculosis lesions.

TUBERCLE BACILLI (BCG) EXPOSED TO COMPOSITIONS IN BUFFER (pH 6) AT ROOM TEMPERATURES FOR TWO WEEKS. WASHED SEDIMENT SUSPENDED IN DUBOS LIQUID MEDIUM AT 37 DEGREES C.

|   | Penicillin, Units/ml. | Sulfadiazine, mg. percent | Isoniazid, mcg./ml. | Growth |
|---|---|---|---|---|
| 1 | 1,000 | 0 | 0 | ± |
| 2 | 10,000 | 0 | 0 | − |
| 3* | 10 | 5 | 1 | − |
| 4 | 0 | 10 | 0 | + |
| 5 | 0 | 0 | 1 | + |

*A composition made in accordance with Example 3.

For human use, for which the compositions of this invention have indicated utility, said compositions are administered intravenously. A suitable dosage is the administration of 2 liters per day (24 hour period) continuously at the rate of about 14 drops per minute. While dosage is, of course, somewhat variable, the above represents good average practice.

While the invention has been described in detail, no unnecessary limitations should be read thereinto, the scope of the invention being set out in the appended claims.

What I claim as new and desire to protect by Letters Patent of the United States is:

1. A composition effective to inhibit tubercle bacilli, said composition consisting essentially of an aqueous solution of a hydrazine derivative of isonicotinic acid, penicillin, sodium benzoate, and a non-toxic acidic material, said solution having a pH between 6 and 7.

2. A composition in accordance with claim 1, including an antibacterial sulfonamide comprising at least one member selected from the group consisting of sulfamerazine, sulfadiazine, sulfathiazole and sulfamethazine.

3. A composition effective to inhibit tubercle bacilli, said composition consisting essentially of an aqueous solution of the following ingredients, said solution having a pH falling within the range of 6 to 7: isoniazid, penicillin, sodium benzoate, an antibacterial sulfonamide, ethyl alcohol, and hydrochloric acid.

4. A composition effective to inhibit tubercle bacilli, said composition consisting essentially of the following ingredients in substantially the following ranges of proportions in relation to each other:

Isoniazid, 100–400 milligrams.
Penicillin, 15–30,000,000 units.
Sodium benzoate, 18–26 grams.
Non-toxic acid to bring pH within limits of 6 to 7.
Water, 1800–2200 cubic centimeters.

5. A composition effective to inhibit tubercle bacilli, said composition having a pH of 6 to 7 and consisting essentially of the following ingredients in substantially the following proportions in relation to each other:

Isoniazid, 100–400 milligrams.
Penicillin, 15–30,000,000 units.
Sodium benzoate, 18–26 grams.
Antibacterial sulfonamide, 4–8 grams.
Ethyl alcohol, 80–120 cubic centimeters.
Hydrochloric acid (to adjust to above pH).
Water, 1800–2200 cubic centimeters.

6. A composition effective to inhibit tubercle bacilli, said composition having a pH of 6 to 7 and consisting essentially of the following ingredients in substantially the following proportions in relation to each other:

Isoniazid, 200 milligrams.
Penicillin, 20,000,000 units.
Sodium benzoate, 20 grams.
Antibacterial sulfonamide, 6 grams.
Heparin, 25,000 units.
Non-toxic acid (to adjust to above pH).
Water, 2000 cubic centimeters.

7. A composition effective to inhibit tubercle bacilli, said composition consisting essentially of an aqueous solution of isoniazid, penicillin, sodium benzoate, an antibacteria sulfonamide, ethyl alcohol, and a non-toxic acid, said solution having a pH between 6 and 7.

8. A composition effective to inhibit tubercle bacilli, said composition consisting essentially of an aqueous solution of the following ingredients, said solution having a pH falling within the range of 6 to 7: isoniazid, penicillin, sodium benzoate, ethyl alcohol, and hydrochloric acid.

9. A composition effective to inhibit tubercle bacilli, said composition consisting essentially of the following ingredients in substantially the following ranges of proportions in relation to each other:

Isoniazid, 300 milligrams.
Penicillin, 30,000,000 units.
Sodium benzoate, 20 grams.
Non-toxic acid to bring pH within limits of 6 to 7.
Water, 1800–2200 cubic centimeters.

References Cited by the Examiner
UNITED STATES PATENTS

Re. 23,947 2/1955 Fox _____ 167—65
2,668,135 2/1954 Vaichulis et al. _____ 167—51.5

OTHER REFERENCES

Chem. Abstracts 38: 2748(7) (1944).
Chem. Abstracts 43: 3882f (1949).
Chem. Abstracts 46: 572i (1952).
Chem. Abstracts 48: 795ef, 4628e, 12224b (1954).
Chem. Abstracts 51: 8805a (1957).
Chem. Abstracts 52: 9421h (1958).

LEWIS GOTTS, *Primary Examiner.*

SHEP K. ROSE, *Assistant Examiner.*